(12) United States Patent
Schwartz

(10) Patent No.: US 12,249,242 B2
(45) Date of Patent: Mar. 11, 2025

(54) HOLDING DETECTION AND DIVERSION INFORMATION

(71) Applicant: THE BOEING COMPANY, Chicago, IL (US)

(72) Inventor: Samantha A. Schwartz, Castle Pines, CO (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 17/863,170

(22) Filed: Jul. 12, 2022

(65) Prior Publication Data

US 2024/0021087 A1    Jan. 18, 2024

(51) Int. Cl.
| | | |
|---|---|---|
| *G08G 5/00* | (2006.01) |
| *B64D 45/00* | (2006.01) |
| *B64D 45/08* | (2006.01) |
| *G08G 5/02* | (2006.01) |
| *H04W 4/42* | (2018.01) |

(52) U.S. Cl.
CPC ........... *G08G 5/0021* (2013.01); *B64D 45/08* (2013.01); *G08G 5/0013* (2013.01); *G08G 5/003* (2013.01); *G08G 5/0078* (2013.01); *G08G 5/0091* (2013.01); *G08G 5/025* (2013.01); *H04W 4/42* (2018.02); *B64D 2045/0075* (2013.01)

(58) Field of Classification Search
CPC .... G08G 5/0021; G08G 5/0013; G08G 5/003; G08G 5/0078; G08G 5/0091; G08G 5/025; G08G 5/0039; G08G 5/0017; G08G 5/04; G08G 5/0034; G08G 5/0008; B64D 45/08; B64D 2045/0075; H04W 4/42; G01C 23/00
See application file for complete search history.

(56) References Cited

U.S. PATENT DOCUMENTS 5,459,666 A * 10/1995 Casper .................. G01C 23/00
701/123
5,842,142 A * 11/1998 Murray ................ G08G 5/0039
340/948

(Continued)

OTHER PUBLICATIONS

Calculating Weight & Balance (Year: 2019).*

(Continued)

*Primary Examiner* — Thomas Ingram
*Assistant Examiner* — Faris Asim Shaikh
(74) *Attorney, Agent, or Firm* — Joseph M. Butscher; The Small Patent Law Group LLC

(57) ABSTRACT

The present disclosure describes systems and methods for providing real-time holding and diversion information to a pilot of an aircraft. In one aspect, the pilot uses an electronic flight bag (EFB) or a flight management computer (FMC) to display in a GUI the holding and diversion information. For example, the EFB can receive ADS-B data that can be used to determine the location of the aircraft in the holding queue (i.e., the aircraft's queue position) and predict the amount of time before the aircraft will be able to land. The EFB or FMC can also display diversion information regarding one or more alternate locations (e.g., alternate airports) in the GUI. In one aspect, the EFB or FMC calculate a bingo fuel and the time until reaching the bingo fuel and the pilot must divert.

17 Claims, 6 Drawing Sheets

(56) References Cited

U.S. PATENT DOCUMENTS

| | | | |
|---|---|---|---|
| 7,612,688 B1* | 11/2009 | Vigeant-Langlois | G01W 1/00 340/945 |
| 9,858,823 B1* | 1/2018 | Lynn | G07C 5/085 |
| 10,019,905 B1* | 7/2018 | Kneuper | G08G 5/0039 |
| 2004/0122567 A1* | 6/2004 | Gaier | G01C 23/00 701/4 |
| 2006/0212180 A1* | 9/2006 | Saffre | G08G 5/0043 701/16 |
| 2007/0127460 A1* | 6/2007 | Wilber | H04L 49/602 370/389 |
| 2008/0300738 A1* | 12/2008 | Coulmeau | G05D 1/0005 701/3 |
| 2016/0210868 A1* | 7/2016 | Donovan | G08G 5/0065 |
| 2016/0229554 A1* | 8/2016 | Kawalkar | G08G 5/0056 |
| 2017/0220668 A1* | 8/2017 | Patton | H03F 1/3247 |
| 2017/0229024 A1* | 8/2017 | Moravek | G01C 21/20 |
| 2017/0243497 A1* | 8/2017 | Kuttappan | G08G 5/0008 |
| 2017/0289309 A1* | 10/2017 | Judd | G06Q 50/40 |
| 2018/0068569 A1* | 3/2018 | Chmelarova | G01C 21/20 |
| 2018/0286257 A1* | 10/2018 | Schwartz | G08G 5/0091 |
| 2018/0357911 A1* | 12/2018 | Chartier | G08G 5/065 |
| 2019/0066520 A1* | 2/2019 | Schwartz | G08G 5/0013 |
| 2019/0213891 A1* | 7/2019 | Snyder | G08G 5/0013 |
| 2020/0073014 A1* | 3/2020 | Huang | G01W 1/10 |
| 2020/0168103 A1* | 5/2020 | Holder | G06F 3/0482 |
| 2020/0168104 A1* | 5/2020 | Holder | G08G 5/0039 |
| 2021/0027636 A1* | 1/2021 | Dziecielski | G08G 5/0026 |
| 2021/0027640 A1* | 1/2021 | Meringer | G06Q 50/40 |
| 2021/0047054 A1* | 2/2021 | Fuscone | B64D 37/00 |
| 2022/0335496 A1* | 10/2022 | Kobayashi | G06Q 10/02 |
| 2022/0343777 A1* | 10/2022 | He | G01C 23/005 |
| 2023/0021088 A1* | 1/2023 | V | G06F 3/04842 |
| 2023/0298476 A1* | 9/2023 | Kemp | G08G 5/0091 701/3 |

OTHER PUBLICATIONS

Automatic Dependent Surveillance-Broadcast (ADS-B) (Year: 2022).*
European Patent Office, extended European Search Report for Application 23182990.4-1009 dated Aug. 12, 2023.

* cited by examiner

HOLDING DETECTION AND DIVERSION INFORMATION

FIELD

Aspects of the present disclosure relate to providing information regarding holding patterns to pilots.

BACKGROUND

Weather can often prevent planes from landing at an airport, or force aircraft to land at a slower rate than they would otherwise. Currently, air traffic controller (ATC) provides each aircraft instructions that establish a holding pattern. The aircraft then stay in this pattern until either they are able to land or they must divert to an alternate airport due to low fuel. ATC must tell the aircraft their position in the queue while holding, which limits opportunities for the pilots to determine whether to remain in the holding pattern or to divert to an alternate airport.

Further, the pilot typically works with a dispatcher to identify the time (or remaining fuel) until the pilot must divert to an alternate airport. But this determination is based on limited information. Thus, the pilot has limited knowledge when determining whether to remain in the holding pattern or to divert to another airport.

SUMMARY

The present disclosure provides a method in one aspect, the method including: receiving, at an electronic flight bag (EFB), Automatic Dependent Surveillance-Broadcast (ADS-B) data using a wireless connection; upon determining an aircraft containing the EFB is in a holding pattern, determining a queue position of the aircraft based on the ADS-B data; estimating a landing time of the aircraft based on a landing rate of other aircraft in the holding pattern and the queue position; and displaying in a graphical user interface (GUI) in the EFB the queue position and the landing time.

In one aspect, in combination with any example of the method above or below, the method includes determining an estimated queue position of the aircraft based on a diversion rate and the queue position, wherein the diversion rate predicts a number of aircraft that will divert to a different location rather than landing at a destination location, wherein the estimated queue position is less than the queue position, where the landing time is based on the estimated queue position.

In one aspect, in combination with any example of the method above or below, the method includes estimating a remaining fuel in the aircraft at landing and a landing weight of the aircraft based on the landing time and a fuel burn rate and displaying in the GUI the remaining fuel and the landing weight.

In one aspect, in combination with any example of the method above or below, the method includes updating the GUI in real time with an updated queue position and an updated landing time in response to receiving updated ADS-B data via the wireless connection.

In one aspect, in combination with any example of the method above or below, the method includes receiving, using the GUI, a selection of an alternate location made by a pilot; in response to receiving the selection of the alternate location, determining a bingo fuel for the alternate location; determining a time remaining until reaching the bingo fuel based on a fuel burn rate; and displaying in the GUI the alternate location, the bingo fuel, and the time remaining until reaching the bingo fuel.

In one aspect, in combination with any example of the method above or below, the method includes receiving, using the GUI, a selection of multiple alternate locations made by a pilot; determining diversion information for each of the multiple alternate locations; and displaying the diversion information for each of the multiple alternate location in the GUI at the same time.

In one aspect, in combination with any example of the method above, the method includes receiving weather conditions for the multiple alternate locations; determining congestion information for the multiple alternate locations indicating a remaining capacity of the multiple alternate locations; and displaying the weather conditions and the congestion information for the multiple alternate location in the GUI at the same time.

The present disclosure provides a EFB in one aspect, the EFB including: a processor and memory including instructions that when executed by the processor enable the EFB to perform an operation. The operation includes receiving, at the EFB, ADS-B data using a wireless connection; upon determining an aircraft containing the EFB is in a holding pattern, determining a queue position of the aircraft based on the ADS-B data; estimating a landing time of the aircraft based on a landing rate of other aircraft in the holding pattern and the queue position; and displaying in a graphical user interface (GUI) in the EFB the queue position and the landing time.

In one aspect, in combination with any example of the EFB above or below, the operation includes determining an estimated queue position of the aircraft based on a diversion rate and the queue position, wherein the diversion rate predicts a number of aircraft that will divert to a different location rather than landing at a destination location, wherein the estimated queue position is less than the queue position, where the landing time is based on the estimated queue position.

In one aspect, in combination with any example of the EFB above or below, the operation includes estimating a remaining fuel in the aircraft at landing and a landing weight of the aircraft based on the landing time and a fuel burn rate and displaying in the GUI the remaining fuel and the landing weight.

In one aspect, in combination with any example of the EFB above or below, the operation includes updating the GUI in real time with an updated queue position and an updated landing time in response to receiving updated ADS-B data via the wireless connection.

In one aspect, in combination with any example of the EFB above or below, the operation includes receiving, using the GUI, a selection of an alternate location made by a pilot; in response to receiving the selection of the alternate location, determining a bingo fuel for the alternate location; determining a time remaining until reaching the bingo fuel based on a fuel burn rate; and displaying in the GUI the alternate location, the bingo fuel, and the time remaining until reaching the bingo fuel.

In one aspect, in combination with any example of the EFB above or below, the operation includes receiving, using the GUI, a selection of multiple alternate locations made by a pilot; determining diversion information for each of the multiple alternate locations; and displaying the diversion information for each of the multiple alternate location in the GUI at the same time.

In one aspect, in combination with any example of the EFB above, the operation includes receiving weather conditions for the multiple alternate locations, determining congestion information for the multiple alternate locations indicating a remaining capacity of the multiple alternate locations, and displaying the weather conditions and the congestion information for the multiple alternate location in the GUI at the same time.

The present disclosure provides a computing system in one aspect, the EFB including: a display, a processor, and memory including instructions that when executed by the processor enable the system to perform an operation. The operation includes receiving ADS-B data using a wireless connection; upon determining an aircraft containing the EFB is in a holding pattern, determining a queue position of the aircraft based on the ADS-B data; estimating a landing time of the aircraft based on a landing rate of other aircraft in the holding pattern and the queue position; and displaying in a graphical user interface (GUI) in the EFB the queue position and the landing time.

In one aspect, in combination with any example of the computing system above or below, the operation includes determining an estimated queue position of the aircraft based on a diversion rate and the queue position, wherein the diversion rate predicts a number of aircraft that will divert to a different location rather than landing at a destination location, wherein the estimated queue position is less than the queue position, where the landing time is based on the estimated queue position.

In one aspect, in combination with any example of the computing system above or below, the operation includes estimating a remaining fuel in the aircraft at landing and a landing weight of the aircraft based on the landing time and a fuel burn rate and displaying in the GUI the remaining fuel and the landing weight.

In one aspect, in combination with any example of the computing system above or below, the operation includes updating the GUI in real time with an updated queue position and an updated landing time in response to receiving updated ADS-B data via the wireless connection.

In one aspect, in combination with any example of the computing system above or below, the operation includes receiving, using the GUI, a selection of an alternate location made by a pilot; in response to receiving the selection of the alternate location, determining a bingo fuel for the alternate location; determining a time remaining until reaching the bingo fuel based on a fuel burn rate; and displaying in the GUI the alternate location, the bingo fuel, and the time remaining until reaching the bingo fuel.

In one aspect, in combination with any example of the computing system above or below, the operation includes receiving, using the GUI, a selection of multiple alternate locations made by a pilot; determining diversion information for each of the multiple alternate locations; and displaying the diversion information for each of the multiple alternate location in the GUI at the same time.

In one aspect, in combination with any example of the computing system above, the operation includes receiving weather conditions for the multiple alternate locations, determining congestion information for the multiple alternate locations indicating a remaining capacity of the multiple alternate locations, and displaying the weather conditions and the congestion information for the multiple alternate location in the GUI at the same time.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure describes systems and methods for providing real-time holding and diversion information to a pilot of an aircraft. In one aspect, the pilot uses an electronic flight bag (EFB) or a flight management computer (FMC) to display the holding and diversion information. For example, the EFB can receive automatic dependent surveillance-broadcast (ADS-B) data that indicates the location and speed of the aircraft, as well as information from other aircraft that are also holding. From this, the EFB can determine the location of the aircraft in the holding queue (i.e., the aircraft's queue position). The EFB can also use a landing rate and a diversion rate to predict the amount of time before the aircraft will be able to land as well as the amount of remaining fuel and landing weight.

In addition to providing holding information, the EFB or FMC can display diversion information regarding one or more alternate locations (e.g., alternate airports). In one aspect, the EFB or FMC calculate a bingo fuel indicating the amount of fuel required for the airplane to approach the current destination, fly through, and divert to the alternate location. The EFB can also display the time, at the current fuel burn, until reaching the bingo fuel and the pilot must divert. In addition, the EFB can retrieve and display the weather conditions and congestion at the alternate locations. With this information, the pilot can make an informed decision whether to continue to hold or to divert early. The aspects herein advantageously provide real-time holding and diversion information using wireless connection to ground data sources such as ADS-B, weather conditions, and congestion information. Further, the pilot can use graphical user interfaces (GUIs) provided by the EFB and FMC to view the real-time holding and diversion information and select different alternate locations for evaluation.

Figure 1:
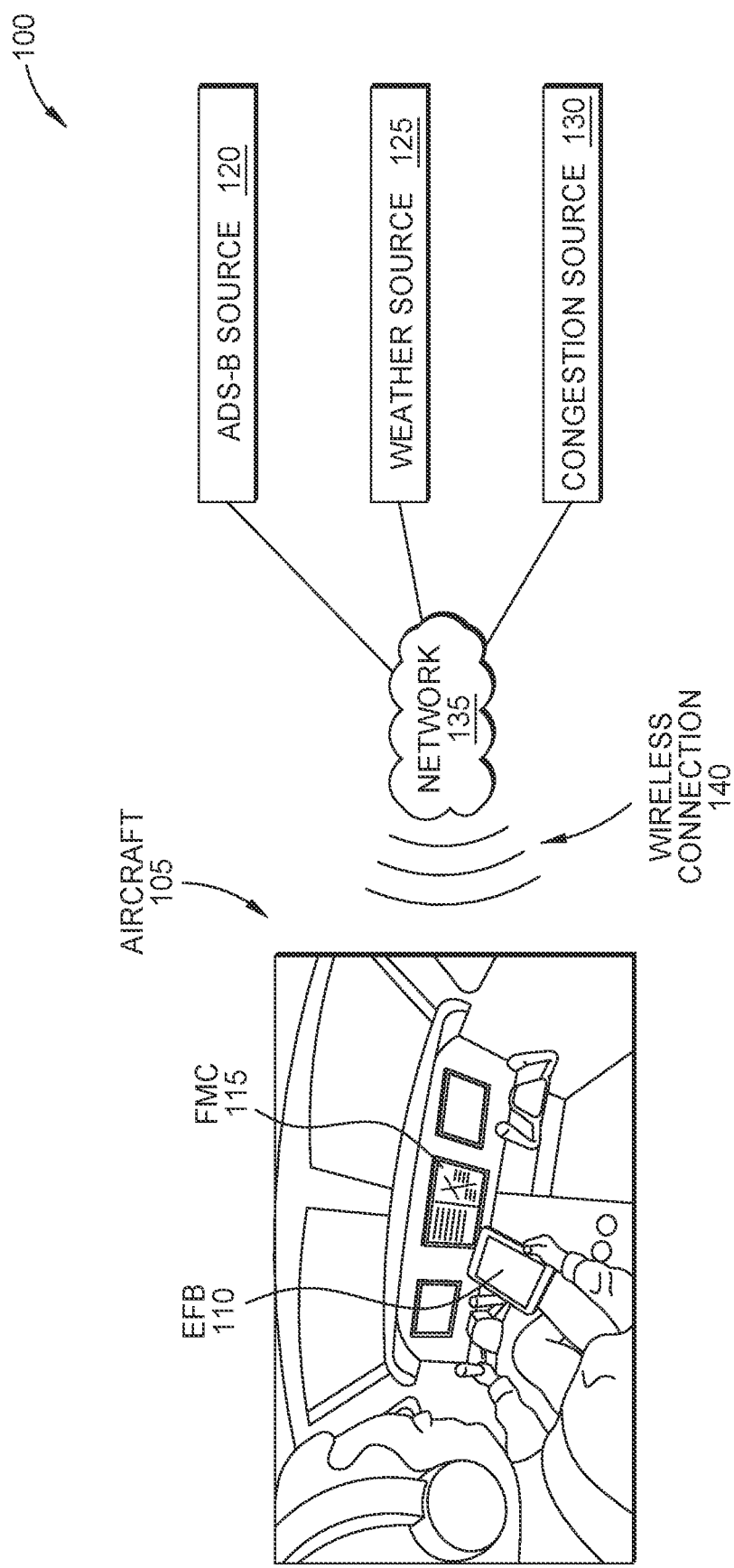
FIG. 1 illustrates a system for providing holding and diversion information to a pilot, according to one aspect described herein.

FIG. 1 illustrates a system 100 for providing holding and diversion information to a pilot, according to one aspect described herein. The system 100 includes an aircraft 105 that is communicatively coupled to various data sources—e.g., an ADS-B source 120, weather source 125, and congestion source 130. The system 100 includes a network 135 that permits the aircraft 105 to receive the data from the data sources using a wireless connection 140. In one aspect, the wireless connection 140 is a broadband communication link to the aircraft 105.

FIG. 1 illustrates a view of the cockpit of the aircraft 105. In this example, the cockpit includes an integrated FMC 115 that is built into the cockpit. In addition, the pilot has access to the EFB 110 which can be a tablet, laptop, or other portable computing device. In one aspect, the EFB 110 is permitted to communicate with the FMC 115 so that it can provide what is often referred to as supplemental aeronautic information to the pilot. Updating the features of the EFB 110, however, do not require the same rigorous certification process as the FMC 115, which makes it an ideal platform to easily and quickly implement new features and interfaces that a pilot may find useful. Some typical uses of the EFB 110 include replacing paper-based reference material (e.g., aircraft operating manual, flight-crew operation manual, and navigation charts), automating functions previously conducted by hand (e.g., take-off performance calculations), displaying weather patterns, and displaying airport issues and delays. This information can be provided to the pilot in real-time.

In this example, the EFB 110 includes a display which can be used to display supplemental information to the pilot. The supplemental information can include information that is stored in the FMC 115 (such as the flight plan, data stored in the navigation DB, and the aircraft metrics) as well as other information that might not be stored in the FMC 115 such as manuals, tutorials, checklists, etc. Enabling communication between the FMC 115 and the EFB 110 permits the pilot to access information stored in the FMC 115 without having to use the interfaces and I/O elements of the FMC 115, which may be cumbersome. Instead, the pilot can use the I/O elements and interfaces on the EFB 110 to navigate and filter the supplemental information which may be more user friendly than the FMC 115. For example, updates to the EFB 110 may not have to go through the same rigorous certification process as updates to the FMC 115. Thus, the EFB 110 (and the software executing on the EFB 110) may be changed and updated quickly.

In one aspect, the EFB 110 displays holding and diversion information using the information provided by the ADS-B source 120, weather source 125, and congestion source 130. As discussed in more detail below, the EFB 110 can display to the pilot holding information such as place in the holding queue, estimated time to land, and landing parameters. The EFB 110 can also display diversion information for one or more alternate locations such as the bingo fuel for the alternate location, estimated time until reaching the bingo fuel, weather conditions at the location, and congestion. The pilot can use the EFB 110 to select the alternate locations. For example, the EFB 110 can include a touch screen, buttons, or other input elements for permitting the pilot to select or change the alternate locations. Once selected, the EFB 110 can then provide the diversion information.

While many of the aspects herein discuss using the EFB 110 to provide the pilot with the holding and diversion information, the FMC 115 can instead perform these tasks (or any other computing system with a processor and memory). In that case, the EFB 110 may be omitted. However, it may be easier to perform these tasks with the EFB 110 because of the regulatory and approval process for adding functions to the FMC 115. Instead, there are technical advantages to using the EFB 110 because lightweight and flexible software can be installed on the EFB 110, which can be deployed rapidly without requiring any changes to current FMCs 115. For example, in aircraft that do not have a FMC 115 capable of performing the aspects described herein, the pilot can instead bring on (or update) the EFB 110 to provide the real-time holding and diversion information.

Figure 2:
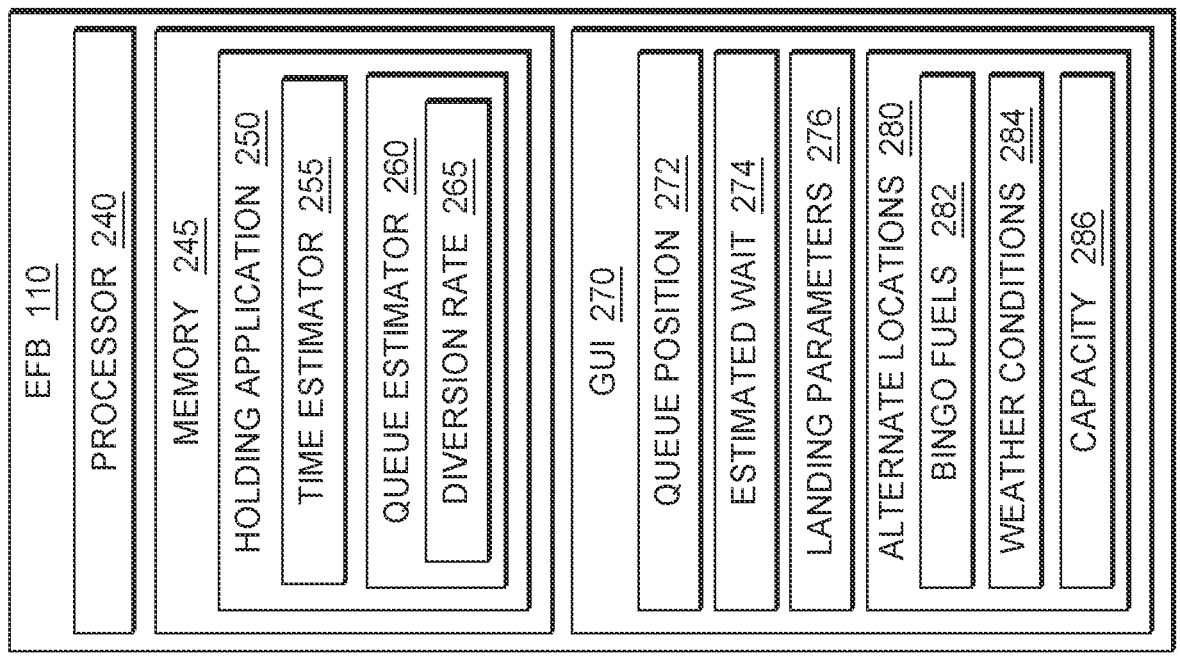
FIG. 2 is a block diagram of a flight management computer and an electronic flight bag, according to one aspect described herein.
Figure 2:
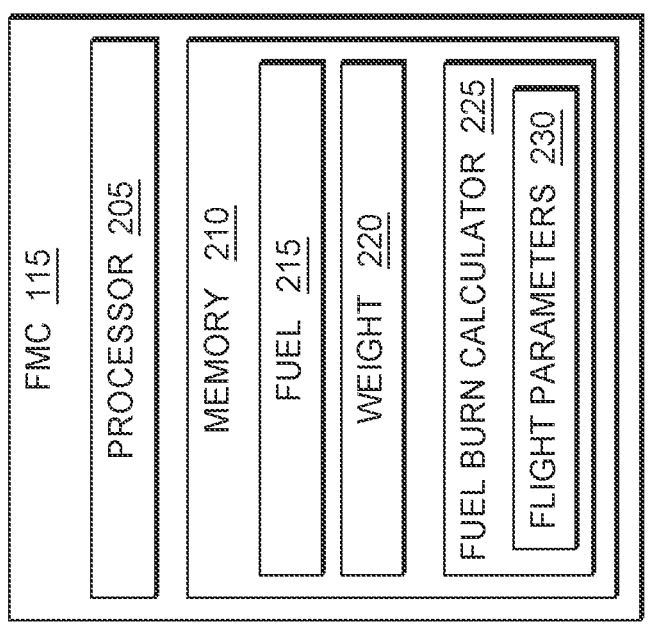

FIG. 2 is a block diagram of the FMC 115 and the EFB 110, according to one aspect described herein. In one aspect, the FMC 115 is an integrated cockpit computing system. The FMC 115 can perform critical flight functions, and as such, may be certified. The FMC 115 includes a processor 205 which represents one or more processing elements which can each include one or more processing cores. The FMC 115 includes memory 210 which can be volatile or nonvolatile memory elements. The memory 210 can store up-to-date information of the aircraft such as the current fuel 215 and weight 220 of the aircraft.

The memory 210 also includes a fuel burn calculator 225 which may be software or firmware that calculates, based on flight parameters 230, a predicted fuel burn for a particular flight plan or destination. That is, the fuel burn calculator 225 can use the flight parameters 230 to estimate how much fuel will be burned by the aircraft to reach a certain destination or to follow a certain flight path. In one aspect, the EFB 110 can transmit alternate locations to the FMC 115 which can use the fuel burn calculator 225 to calculate the bingo fuels for alternate locations. However, in other aspects, the EFB 110 may include its own fuel burn calculator, although this may sacrifice some accuracy given that the FMC 115 may have access to flight parameters 230 that the EFB 110 does not.

The EFB 110 includes a processor 205 which represents one or more processing elements which can each include one or more processing cores. The EFB 110 includes memory 245 which can be volatile or nonvolatile memory elements. The memory 245 stores a holding application 250 (e.g., a software application) that generates the holding and diversion information for display. The holding application 250 includes a time estimator 255 that can predict the amount of time before the aircraft will be able to land. This estimate can be based on the queue position, the landing rate, and the diversion rate.

In another aspect, the time estimator 255 can be used to predict the amount of time before reaching the bingo fuel for an alternate location. That is, the time estimator 255 can inform the pilot how long until he needs to divert to the alternate location.

The holding application 250 also includes a queue estimator 260 for determining the position of the aircraft in the hold queue. In one aspect, the queue estimator 260 uses the ADS-B data to identify the actual position of the aircraft in the queue. For example, the ADS-B data can identify the order in which the aircraft were told to hold. Because air traffic control can use a first in-first out queueing process, based on this order, the queue estimator 260 can determine the position of the aircraft in the queue, without the pilot having to receive the queue order from air traffic controller.

In one aspect, the queue estimator 260 determines an estimate queue position using a historical diversion rate for the airport. For example, based on tracking previous weather delays which caused aircraft to enter into a holding pattern, the historical data can indicate how many of those airplanes ended up landing at the airport and how many diverted to another airport. By identifying the diversion rate, the queue estimator 260 can use this rate to predict how many airplanes in front of the queue will end up diverting rather than landing. Thus, the queue estimator 260 can generate an estimate queue position that may better reflect how long the aircraft will wait before being able to land at the destination airport.

In another aspect, the queue estimator 260 may have access to the fuel information of the other aircraft that are holding. With this, the queue estimator 260 can determine, based on the landing rate, which of the airplanes in front of the aircraft in the queue will likely have to divert before being able to land. Thus, the queue estimator 260 may be able to provide an estimate queue position that is more accurate than relying on a historical diversion rate.

The EFB 110 includes a GUI 270 which displays holding and diversion information to the pilot, as well as potentially other information such as weather, flight manuals, and the like. In this example, the GUI 270 displays holding information which includes a queue position 272, estimated wait 274 until landing, and landing parameters 276. The queue position 272 indicates the position of the aircraft in the queue. The queue position 272 can be the actual queue position (as indicated by the ADS-B data), an estimated queue position (e.g., generated using a historical diversion rate or by knowing the fuel of the other holding aircraft), or both. The GUI 270 also displays an estimated wait 274. This can be calculated using the time estimator 255. Further, the GUI 270 can display landing parameters 276 which indicate the weight of the aircraft when it lands (given the estimated wait 274), the amount of remaining fuel, and the like.

In this example, the GUI 270 also displays diversion information for one or more alternate locations 280 (e.g., alternative airports) the pilot can divert to instead of landing at the destination airport. The alternate location 280 can be automatically displayed by the EFB 110 based on a distance from the current location of the aircraft to other airports other than the destination airport. In another aspect, the pilot can use the GUI 270 to select the alternate location 280. For example, the GUI 270 may display a list of nearby airports and the pilot can select one (or ones) of the alternatives for the EFB 110 to display detailed diversion information for. The pilot may select one or more alternate locations 280 she believes are most likely candidates and request the EFB 110 display (and update in real-time) the diversion information for these locations 280.

In FIG. 2, the GUI 270 can display diversion information such as bingo fuels 282 for the locations 280, weather conditions 284 at the locations 280, and the capacity 286 at the locations 280. As mentioned above, the bingo fuels 282 is the amount of fuel required for the plane to attempt to land at the destination airport, unsuccessfully land, and then divert to land at the alternate location 280. The bingo fuel can change as the aircraft continues to move in the holding pattern, and thus, the holding application 250 can continue to calculate the bingo fuels 282 for the alternate locations 280 as the aircraft changes locations, altitudes, and as weather conditions change.

The weather conditions 284 can inform the pilot of the weather conditions at the location, which can indicate whether airplanes landing at that location may also be asked to hold. The pilot can using the weather conditions 284 to determine whether it is likely the aircraft, after diverting, may have to enter a holding pattern at the alternate location 280.

The holding application 250 can identify the capacity 286 using the ADS-B data to determine the number of planes already on the ground at the alternate location 280. By knowing the current number of planes at the alternate location 280 and the total capacity of the location 280, the EFB 110 can display the remaining capacity 286 to the pilot. With this information, the pilot can predict how long the aircraft would have to remain at the alternate location before being able to fly to the destination airport. That is, knowing the capacity 286 at the alternate locations 280 can help the pilot know the turnaround time from leaving the locations 280 to proceed to the destination airport when, for example, the weather has cleared. The pilot may choose an alternate location 280 with more remaining capacity 286.

FIG. 2 illustrates just some of the holding and diversion information that can be generated and displayed using the EFB 110. Moreover, in addition to displaying this information, the EFB 110 can be used to display other types of information that is related to, or unrelated to, the holding and diversion information.

Figure 3:
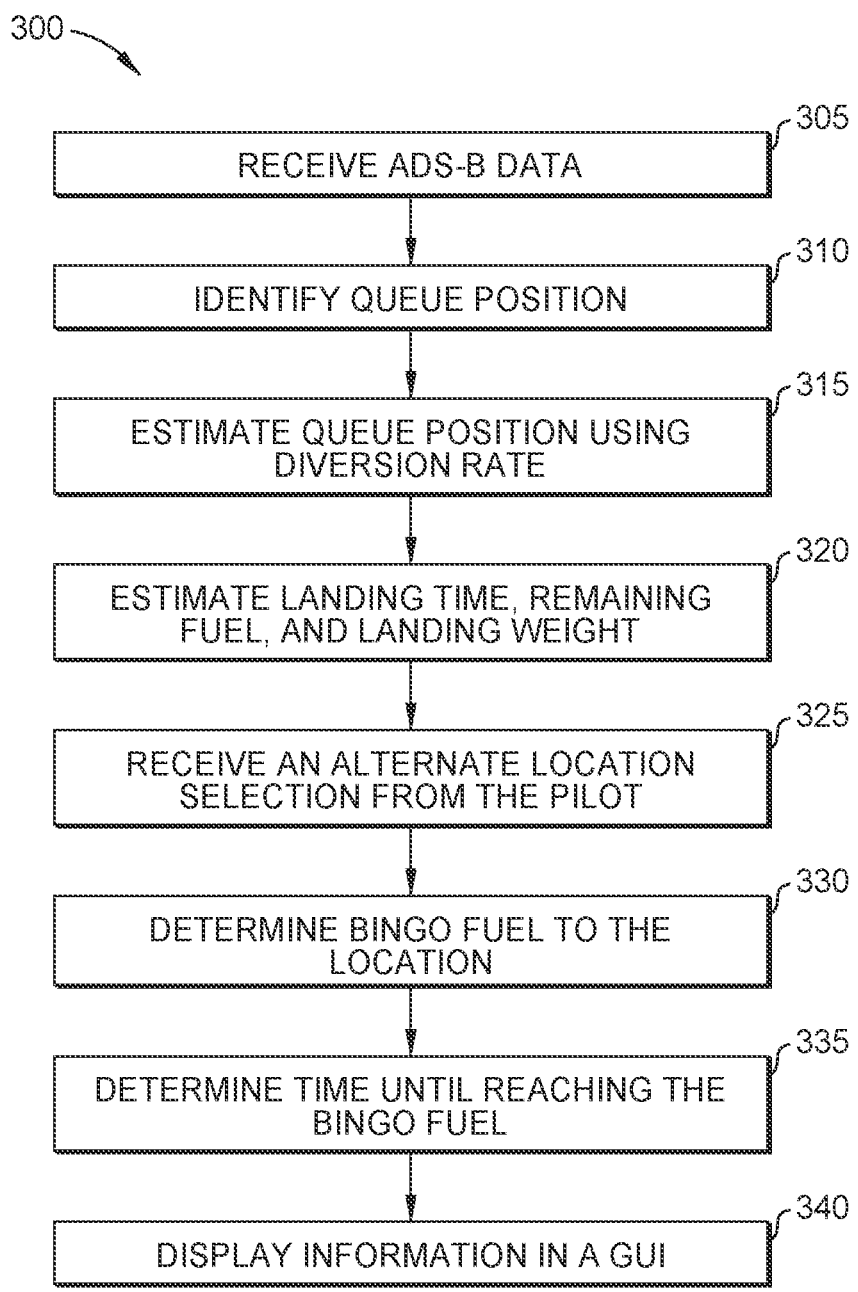
FIG. 3 is a flowchart for providing holding and diversion information to a pilot, according to one aspect described herein.

FIG. 3 is a flowchart of a method 300 for providing holding and diversion information to a pilot, according to one aspect described herein. The blocks in the method 300 are described as being performed by the EFB (e.g., the EFB 110 discussed in FIGS. 1 and 2) but can be performed by other types of computing systems such as an integrated flight computer (e.g., the FMC).

At block 305, the EFB receives ADS-B data using a wireless connection. In one aspect, the EFB is in an aircraft that is currently flying. The ADS-B may be continually received (at intervals) at the EFB using the wireless connection. In one aspect, the ADS-B data is received in response to the aircraft entering a holding pattern or being placed by ATC into a holding queue. However, in other aspects, the EFB may receive the ADS-B data when flying normally.

At block 310, the holding application in the EFB identifies the queue position of the aircraft in the holding queue. The holding application can derive the queue position using the ADS-B data which indicates when the other aircraft flying to the same destination airport entered into the holding pattern. From this, a queue estimator in the holding application can determine the aircraft's position in the holding queue.

At block 315, the queue estimator estimates the queue position using the diversion rate. This diversion rate can be determined using a historical diversion rate or can be determined by knowing the fuel of the other aircraft in the holding pattern. For example, the queue estimator can use the diversion rate to determine how many airplanes that are in front of the aircraft will end up diverting.

However, block 315 is optional. In other aspects, the holding application can display only the actual queue position rather than providing an estimated queue position.

At block 320, the holding application determines the estimated landing time, remaining fuel, landing weight, and potentially other landing parameters. In one aspect, the time estimator can use the actual or estimated queue position to estimate the landing time. For example, the holding application can use the ADS-B data to determine the landing rate of the planes that are queued in front of the aircraft. Using the landing rate and the actual or estimate queue position, the holding application can determine the estimated time until the aircraft will be able to land.

The holding application can also use the landing time and a fuel burn rate to determine the fuel the aircraft will have left when landing, as well as the landing weight. For example, the EFB may receive the fuel burn rate from the FMC (e.g., using the fuel burn calculator 225 in FIG. 2). In another example, the pilot may input the current fuel (in kilograms or pounds) into the EFB using the GUI. The holding application can use the current flight parameters to calculate the fuel burn rate, although it might not have access to the same flight parameters as the FMC. The landing time and fuel burn rate can also be used to determine the landing weight, which is primarily affected by the aircraft consuming the fuel.

The holding application can generate other landing parameters besides the ones mentioned here using the ADS-B data and information received from the FMC. For example, there may be other landing parameters that may be useful to a pilot to determine whether to divert or to continue to hold.

At block 325, the holding application receives a selection of an alternate location. In one aspect, the pilot uses the GUI on the EFB (or a FMC) to select an alternate location by, e.g., typing in the name of the location or by selecting a location from a list of potential locations automatically displayed by the EFB based on the current location of the aircraft. Advantageously, the GUI in the EFB provides the pilot with the ability to select different alternate locations and receive real-time updates containing diversion information regarding those locations.

At block 330, the holding application determines the bingo fuel for the selected alternate location. The bingo fuel as used herein is an amount of remaining fuel when the pilot should divert to the alternate location. In one aspect, the bingo fuel is the amount of fuel need for the aircraft to attempt to land at the destination airport, abort, and then land at the alternate location. The bingo fuel can be calculated using the FMC and then transmitted to the EFB or can be calculated by the EFB. For example, the EFB may send the alternate location to the FMC and request that it calculate the bingo fuel for the location using its flight parameters. Or the EFB may have a native flight planning tool which can calculate the bingo fuel.

At block 335, the time estimator in the EFB calculates the remaining time until the aircraft reaches the bingo fuel. For example, the plane may have 40,000 kilograms of fuel and the bingo fuel may be 30,000 kilograms. Instead of the pilot have to calculate or estimate how much time until reaching 30,000 kilograms, the EFB can use its own fuel burn calculator or the FMC's calculator to determine the fuel burn rate and then estimate the amount of time remaining before reaching bingo fuel. For example, if the fuel burn rate is 50 kg per minute and the aircraft has 10,000 kilograms of fuel to burn before reaching bingo fuel, then the EFB determines that the aircraft has 200 minutes until reaching bingo fuel.

At block 340, the EFB displays the holding and diversion information to the pilot using a GUI. That is, the EFB displays the holding information (e.g., landing time, remaining fuel, and landing weight) and the diversion information (e.g., alternate location, bingo fuel, and time until reaching bingo fuel) to the pilot.

In one aspect, the method 300 repeats when the EFB receives data that can change any of the holding and diversion information, such as updated ADS-B data, updated weather data, updated congestion data, updated fuel burn rate, and the like. Thus, the method 300 can repeat to provide real-time updates to the pilot in the GUI regarding the holding and diversion information.

Further, a least a portion of the method 300 can repeat if the pilot selects a different alternate location using the GUI. For example, after selecting a new alternate location, the method 300 can then perform blocks 325-340 to determine the diversion information for the new location.

Figure 4:
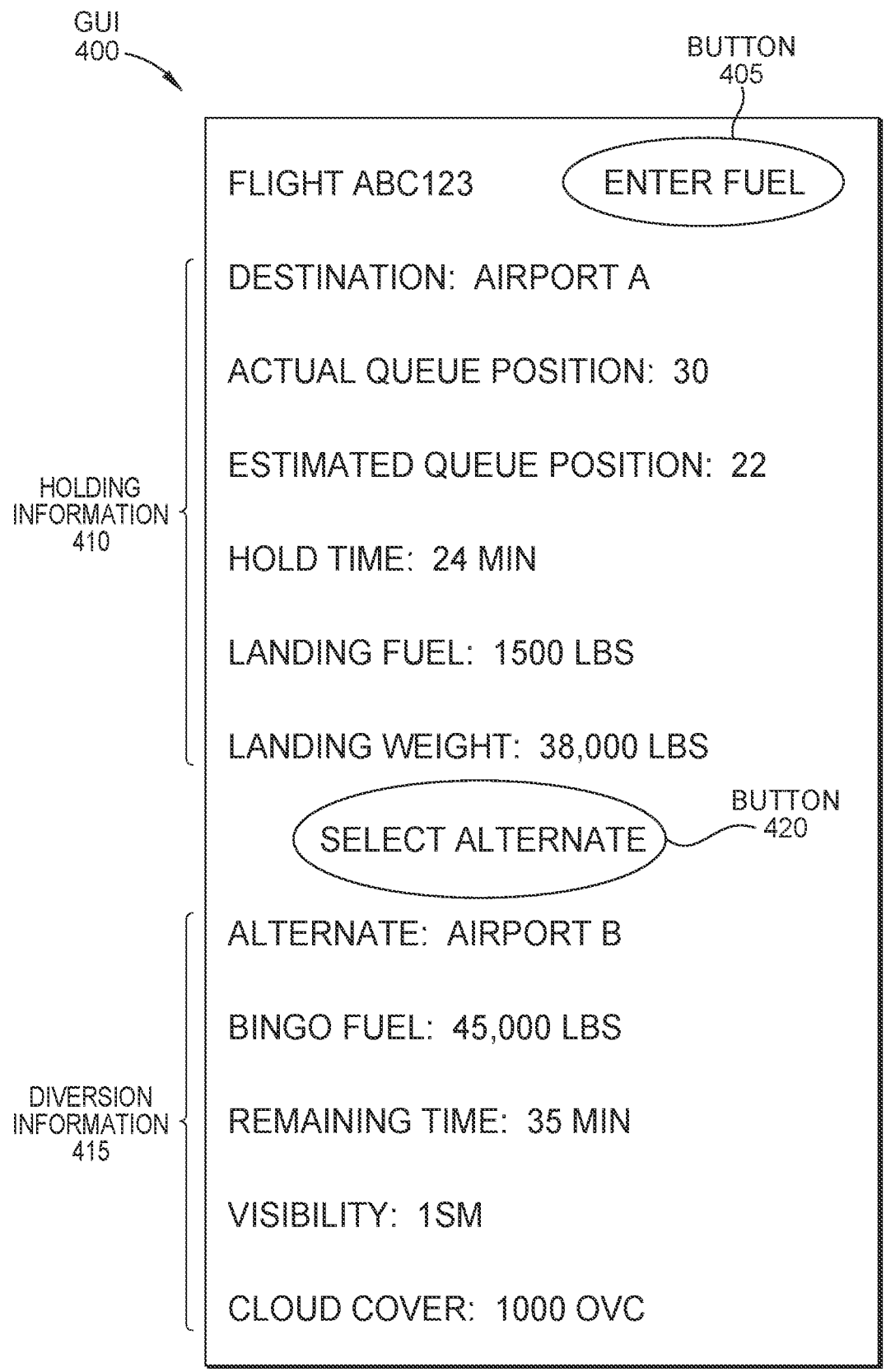
FIG. 4 is a graphical user interface for providing holding and diversion information to a pilot, according to one aspect described herein.

FIG. 4 is a GUI 400 for providing holding and diversion information to a pilot, according to one aspect described herein. In one aspect, the GUI 400 is displayed on the EFB, but could be displayed on any computing device on the aircraft such as the FMC.

The top half of the GUI 400 provides holding information 410 for the destination location of the flight (ABC123) while the bottom half lists diversion information 415 for a selected alternate location. The GUI 400 also includes a button 405 which the pilot can use to enter in the current fuel of the aircraft which can then be used to perform the calculations discussed above. However, in another aspect, the EFB may be able to receive the current fuel directly from the FMC, in which case, the button 405 could be omitted.

The holding information 410 includes such information as the destination location (Airport A), the actual queue position of the aircraft in the holding queue which is determined from the ADS-B data, the estimated queue position which can be calculated using a diversion rate, an estimated hold time, landing fuel, and the landing weight of the aircraft. In one aspect, the hold time, landing fuel, and the landing weight are based on the estimated queue position rather than the actual queue position. However, in another aspect, the hold time, landing fuel, and the landing weight can be based on the actual queue position, or the GUI 400 can display the hold time, landing fuel, and the landing weight for both the actual and the estimate queue positions.

The GUI 400 includes a button 420 that permits the pilot to select an alternate location in case of diversion. In this example, the pilot has already used the button 420 to select Airport B (e.g., by typing in the name or selecting the location from a prepopulated list) as the alternate location and the EFB has calculated diversion information 415 for this location using the techniques described in method 300 in FIG. 3. As shown, the GUI 400 displays the bingo fuel for Airport B, the estimated remaining flight time until the aircraft reaches the bingo fuel, and weather conditions at Airport B (e.g., visibility and cloud cover).

GUI 400 displays just a few of the examples of holding information 410 and diversion information 415 that can be output using the EFB or other computing device. Further, the EFB can update the GUI 400 in real time as updated data is received.

Figure 5:
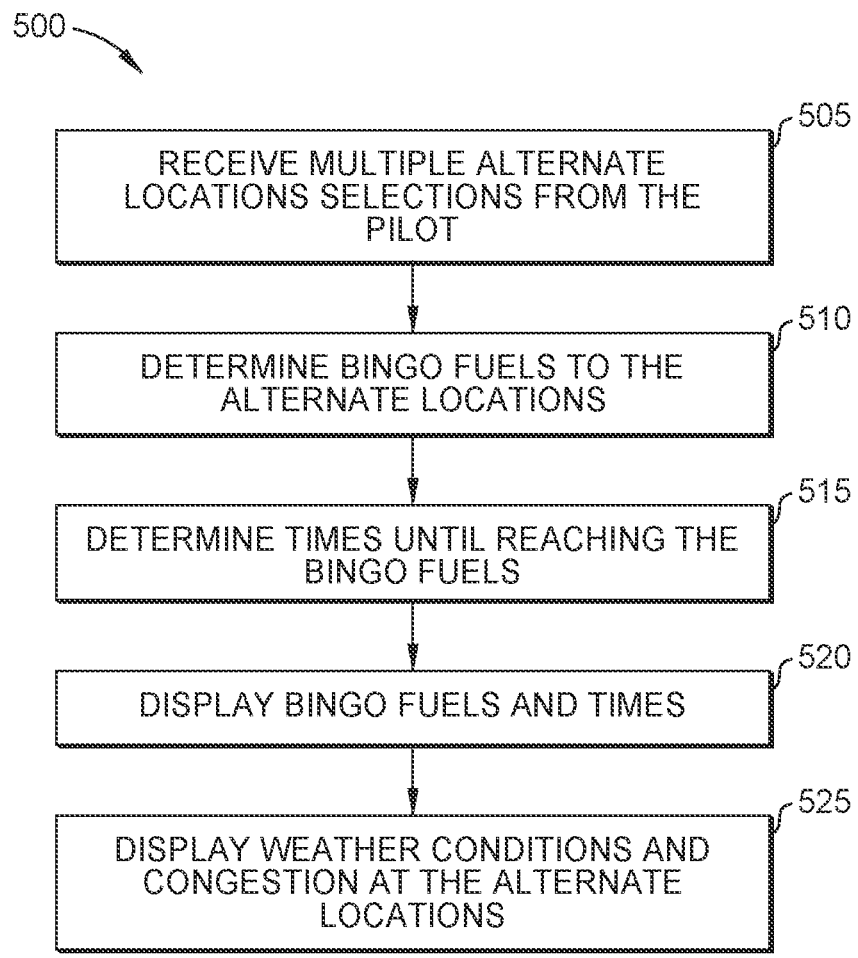
FIG. 5 is a flowchart for providing diversion information for multiple alternate locations, according to one aspect.

FIG. 5 is a flowchart of a method 500 for providing diversion information for multiple alternate locations, according to one aspect. At block 505, the holding application receives selections of multiple alternate locations. In one aspect, the pilot uses the GUI on the EFB (or a FMC) to select multiple alternate locations by, e.g., typing in the name of the locations or by selecting the locations from a list of potential locations automatically displayed by the EFB based on the current location of the aircraft.

At block 510, the holding application determines the bingo fuels to the selected alternate locations. As discussed in the method 300, the bingo fuel can be calculated using the FMC and then transmitted to the EFB or can be calculated by the EFB. In this case, since there are multiple alternate locations, the EFB may submit each alternate location to the FMC sequentially. That is, the EFB may submit the alternate locations one at a time to the FMC. After receiving the bingo fuel for the current location, the EFB then submits the next selected alternate location. Alternatively, the EFB may execute its own flight planning tool to calculate the bingo fuels. Because the alternate locations are different airports, the bingo fuels for these different locations are also likely to be different.

At block 515, the time estimator determines times until reaching the bingo fuels. The EFB can use the fuel burn rate and the current fuel to determine (or estimate) how long until the aircraft reaches the bingo fuels for each of the alternate locations.

At block 520, the EFB displays the bingo fuels and times for each of the selected alternate locations. In one aspect, the alternate locations, their respective bingo fuels, and time until reach the bingo fuels are all displayed on the same GUI. Thus, the pilot can easily compare the diversion information for the selected alternate locations. For example, the diversion information for the different alternate locations can be displayed side-by-side in the GUI so the pilot can more easily make diversion decisions.

At block 530, the EFB displays weather conditions and congestion information at the alternate locations. The weather conditions can indicate to the pilot the likelihood that the aircraft will be forced into a holding pattern if it diverts to the alternate location. For example, the same weather pattern that is forcing the aircraft to hold at the destination location may also be affecting one or more of the selected alternate locations. Displaying the weather conditions on the GUI gives the pilot one source for evaluating the alternate locations rather than having to use a separate GUI of the EFB, some other computing device, or dispatch to learn the weather conditions at the alternate locations.

The congestion information can indicate the capacity of the alternate locations. As discussed above, the holding application can identify the capacity using the ADS-B data to determine the number of planes already on the ground at the alternate locations. By knowing the current number of planes at the alternate locations and their total capacity, the EFB can display the remaining capacity on the GUI. With this information, the pilot can predict how long the aircraft will have to remain at the alternate location before being able to fly to the destination airport. That is, the congestion information at the alternate locations can help the pilot know the turnaround time from leaving the locations to proceed to the destination airport.

Figure 6:
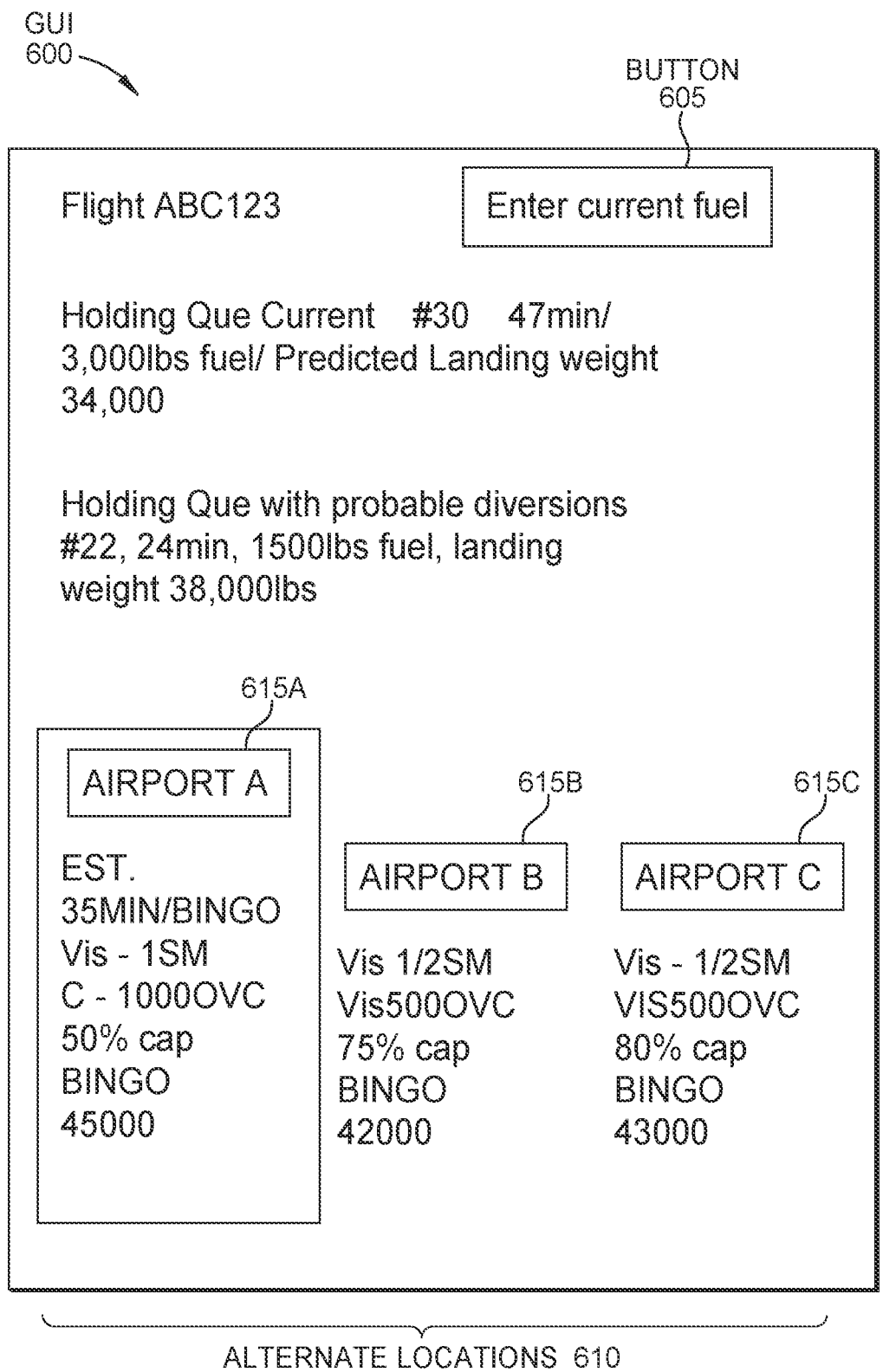
FIG. 6 is a graphical user interface for providing diversion information for multiple alternate locations, according to one aspect described herein.

FIG. 6 is a GUI 600 for providing diversion information for multiple alternate locations, according to one aspect described herein. In one aspect, the GUI 600 is displayed on the EFB, but could be displayed on any computing device on the aircraft such as the FMC.

The top half of the GUI 400 provides holding information for the flight (ABC123) while the bottom half shows diversion information for multiple selected alternate locations 610. The GUI 600 also includes a button 605 which the pilot can use to enter in the current fuel of the aircraft which can then be used to perform the calculations discussed above. However, in another aspect, the EFB may be able to receive the current fuel directly from the FMC, in which case, the button 605 could be omitted.

The holding information includes two portions where a first portion lists the actual queue position of the aircraft along with the estimated time before the aircraft lands and the fuel that will be burned while holding. The first portion also indicates the landing weight of the aircraft.

The second portion lists the estimate queue position of the aircraft using a calculated or historical diversion rate. As shown, the estimated queue position is lower than the actual queue position. The second portions also displays the estimated time before the aircraft lands given the estimated queue position, and the fuel that will be burned while holding. The second portion also displays the landing weight of the aircraft. Because the estimated queue position is a smaller number than the actual queue position, the remaining time and the fuel burn are smaller numbers than the ones in the first portion. However, the landing weight is a larger number.

In FIG. 6, the pilot has selected multiple alternate locations for the GUI 600 to provide diversion information. For example, the pilot may select Airport A, B, and C as potential diversion locations using an input element (e.g., a button, keyboard, etc.). The GUI 600 then displays diversion information for each of the alternate locations 610.

In another aspect, the GUI 600 may display the alternate locations automatically, but then buttons 615A-C can be used by the pilot to select a particular alternate location when she wishes to see additional information. In any case, the GUI 600 may not display all the diversion information for the alternate locations 610 until selected by the pilot. In this example, the pilot has used the button 615A to instruct the GUI 600 to display additional information regarding Airport A. Selecting the button 615A causes the GUI 600 to display the estimated time until reaching bingo fuel for Airport A. Notably, the remaining time until reaching the bingo fuels for the other alternate locations (i.e., Airports B and C) are not displayed until their corresponding buttons 615B and 615C are selected by the pilot. In this manner, some of the diversion information may not be displayed until the particular location is selected by the pilot.

However, other diversion information may be displayed for all the selected alternate locations 610. In this example, the GUI 600 displays the weather conditions (e.g., visibility and cloud cover) for each of the alternate locations 610. The GUI 600 also displays the remaining capacity (cap) at each of the locations 610, as well as the bingo fuel for diverting to those locations 610 regardless whether the pilot has currently selected the location 610. However, in other aspects, the GUI 600 may always display the remaining time and bingo fuels for each of the alternate locations 610, but the pilot may have to select one of the buttons 615 before the GUI 600 displays the weather conditions and the remaining capacity at the selected location 610.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
receiving, at an electronic flight bag (EFB), Automatic Dependent Surveillance-Broadcast (ADS-B) data using a wireless connection;
upon determining an aircraft containing the EFB is in a holding pattern, determining a queue position of the aircraft based on the ADS-B data;
estimating a landing time of the aircraft based on a landing rate of other aircraft in the holding pattern and the queue position;
displaying, in real time, in a graphical user interface (GUI) in the EFB the queue position and the landing time;
receiving, using the GUI, a selection of an alternate location made by a pilot;
in response to receiving the selection of the alternate location, determining a bingo fuel for the alternate location;
determining a time remaining until reaching the bingo fuel based on a fuel burn rate; and
displaying, in real time, in the GUI the alternate location, the bingo fuel, and the time remaining until reaching the bingo fuel.

2. The method of claim 1, further comprising:
determining an estimated queue position of the aircraft based on a diversion rate and the queue position, wherein the diversion rate predicts a number of aircraft that will divert to a different location rather than landing at a destination location, wherein the estimated queue position is less than the queue position,
wherein the landing time is based on the estimated queue position.

3. The method of claim 1, further comprising:
estimating a remaining fuel in the aircraft at landing and a landing weight of the aircraft based on the landing time and a fuel burn rate; and
displaying in the GUI the remaining fuel and the landing weight.

4. The method of claim 1, further comprising:
updating the GUI in real time with an updated queue position and an updated landing time in response to receiving updated ADS-B data via the wireless connection.

5. The method of claim 1, further comprising:
receiving, using the GUI, a selection of multiple alternate locations made by a pilot;
determining diversion information for each of the multiple alternate locations; and
displaying the diversion information for each of the multiple alternate location in the GUI at the same time.

6. The method of claim 5, further comprising:
receiving weather conditions for the multiple alternate locations;
determining congestion information for the multiple alternate locations indicating a remaining capacity of the multiple alternate locations; and
displaying the weather conditions and the congestion information for the multiple alternate location in the GUI at the same time.

7. An electronic flight bag (EFB), comprising:
a processor; and
memory including instructions that when executed by the processor enable the EFB to perform an operation, the operation comprising:
receiving, at the EFB, ADS-B data using a wireless connection;
upon determining an aircraft containing the EFB is in a holding pattern, determining a queue position of the aircraft based on the ADS-B data;
estimating a landing time of the aircraft based on a landing rate of other aircraft in the holding pattern and the queue position;
displaying, in real time, in a graphical user interface (GUI) in the EFB the queue position and the landing time;
receiving, using the GUI, a selection of an alternate location made by a pilot;
in response to receiving the selection of the alternate location, determining a bingo fuel for the alternate location;
determining a time remaining until reaching the bingo fuel based on a fuel burn rate; and
displaying, in real time, in the GUI the alternate location, the bingo fuel, and the time remaining until reaching the bingo fuel.

8. The EFB of claim 7, wherein the operation further comprises:
determining an estimated queue position of the aircraft based on a diversion rate and the queue position, wherein the diversion rate predicts a number of aircraft that will divert to a different location rather than landing at a destination location, wherein the estimated queue position is less than the queue position,
wherein the landing time is based on the estimated queue position.

9. The EFB of claim 7, wherein the operation further comprises:
estimating a remaining fuel in the aircraft at landing and a landing weight of the aircraft based on the landing time and a fuel burn rate; and
displaying in the GUI the remaining fuel and the landing weight.

10. The EFB of claim 7, wherein the operation further comprises:
updating the GUI in real time with an updated queue position and an updated landing time in response to receiving updated ADS-B data via the wireless connection.

11. The EFB of claim 7, wherein the operation further comprises:
receiving, using the GUI, a selection of multiple alternate locations made by a pilot;
determining diversion information for each of the multiple alternate locations; and
displaying the diversion information for each of the multiple alternate location in the GUI at the same time.

12. The EFB of claim 11, wherein the operation further comprises:
receiving weather conditions for the multiple alternate locations;
determining congestion information for the multiple alternate locations indicating a remaining capacity of the multiple alternate locations; and
displaying the weather conditions and the congestion information for the multiple alternate location in the GUI at the same time.

13. A computing system, comprising:
a display;
a processor; and
memory including instructions that when executed by the processor enable the system to perform an operation, the operation comprising:
receiving ADS-B data using a wireless connection;
upon determining an aircraft containing the computing system is in a holding pattern, determining a queue position of the aircraft based on the ADS-B data;
estimating a landing time of the aircraft based on a landing rate of other aircraft in the holding pattern and the queue position;
displaying, in real time, in a graphical user interface (GUI) in the display the queue position and the landing time, wherein the queue position and the landing time are updated in real-time in the GUI using updated ADS-B data;
receiving, using the GUI, a selection of an alternate location made by a pilot;
in response to receiving the selection of the alternate location, determining a bingo fuel for the alternate location;
determining a time remaining until reaching the bingo fuel based on a fuel burn rate; and
displaying, in real time, in the GUI the alternate location, the bingo fuel, and the time remaining until reaching the bingo fuel.

14. The computing system of claim 13, wherein the operation further comprises:
determining an estimated queue position of the aircraft based on a diversion rate and the queue position, wherein the diversion rate predicts a number of aircraft that will divert to a different location rather than landing at a destination location, wherein the estimated queue position is less than the queue position,
wherein the landing time is based on the estimated queue position.

15. The computing system of claim 13, wherein the operation further comprises:
estimating a remaining fuel in the aircraft at landing and a landing weight of the aircraft based on the landing time and a fuel burn rate; and
displaying in the GUI the remaining fuel and the landing weight.

16. The computing system of claim 13, wherein the operation further comprises:
receiving, using the GUI, a selection of multiple alternate locations made by a pilot;
determining diversion information for each of the multiple alternate locations; and
displaying the diversion information for each of the multiple alternate location in the GUI at the same time.

17. The computing system of claim 16, wherein the operation further comprises:
receiving weather conditions for the multiple alternate locations;
determining congestion information for the multiple alternate locations indicating a remaining capacity of the multiple alternate locations; and
displaying the weather conditions and the congestion information for the multiple alternate location in the GUI at the same time.

* * * * *